US006991053B2

(12) United States Patent
Kuang et al.

(10) Patent No.: US 6,991,053 B2
(45) Date of Patent: Jan. 31, 2006

(54) CLOSED-LOOP POWER CONTROL FOR HYBRID ELECTRIC VEHICLES

(75) Inventors: Ming Lang Kuang, Canton, MI (US); David Estes Smith, Knoxville, TN (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 10/248,886

(22) Filed: Feb. 27, 2003

(65) Prior Publication Data

US 2004/0168840 A1   Sep. 2, 2004

(51) Int. Cl.
   *B60K 1/00*   (2006.01)
   *B60K 6/00*   (2006.01)
(52) U.S. Cl. .................................... 180/65.2; 180/65.4
(58) Field of Classification Search ............... 280/65.1, 280/65.2, 65.3, 65.4, 65.6; 701/22; 180/65.1, 180/65.2, 65.3, 65.4, 65.6
See application file for complete search history.

(56) References Cited

U.S. PATENT DOCUMENTS

| 5,285,111 A | 2/1994 | Sherman |
| 5,343,970 A | 9/1994 | Severinsky |
| 5,637,987 A | 6/1997 | Fattic et al. |
| 5,775,449 A * | 7/1998 | Moroto et al. ............. 180/65.2 |
| 5,823,281 A * | 10/1998 | Yamaguchi et al. ....... 180/65.2 |
| 6,208,034 B1 | 3/2001 | Yamaguchi |
| 6,269,290 B1 | 7/2001 | Egami et al. |
| 6,364,807 B1 | 4/2002 | Koneda et al. |
| 6,405,818 B1 * | 6/2002 | Anthony et al. ........... 180/65.8 |
| 6,490,511 B1 * | 12/2002 | Raftari et al. .................. 701/22 |
| 6,533,693 B2 * | 3/2003 | Bowen et al. .................. 475/5 |
| 6,553,287 B1 * | 4/2003 | Supina et al. .................. 701/22 |
| 6,555,927 B1 * | 4/2003 | Suzuki et al. ................. 290/34 |
| 6,664,651 B1 * | 12/2003 | Breida et al. .................. 290/29 |
| 6,688,411 B2 * | 2/2004 | Boggs et al. .............. 180/65.2 |
| 6,692,405 B2 * | 2/2004 | Minowa et al. ................. 477/5 |

* cited by examiner

*Primary Examiner*—Christopher P. Ellis
*Assistant Examiner*—Brian Swenson
(74) *Attorney, Agent, or Firm*—Brooks Kushman P.C.; Carlos Hanze

(57) ABSTRACT

A control system and control method for a hybrid electric vehicle powertrain having an engine, an electric motor and an electric generator with gearing for effecting split power distribution from separate power sources. Power delivery to vehicle traction wheels is coordinated to meet a driver's demand for power as much as possible without violating predefined maximum and minimum powertrain limits, including the limits of the battery subsystem.

7 Claims, 4 Drawing Sheets

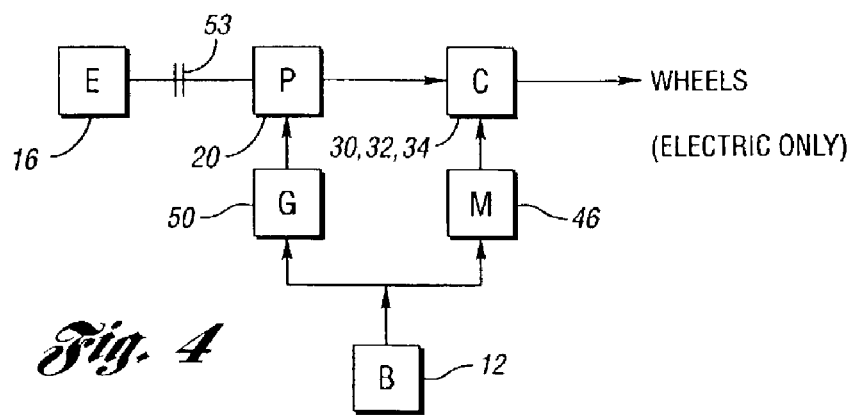
Fig. 4 (ELECTRIC ONLY)
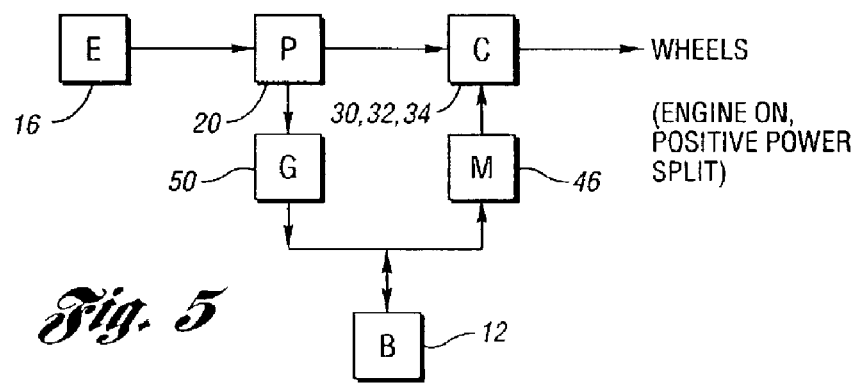
Fig. 5 (ENGINE ON, POSITIVE POWER SPLIT)
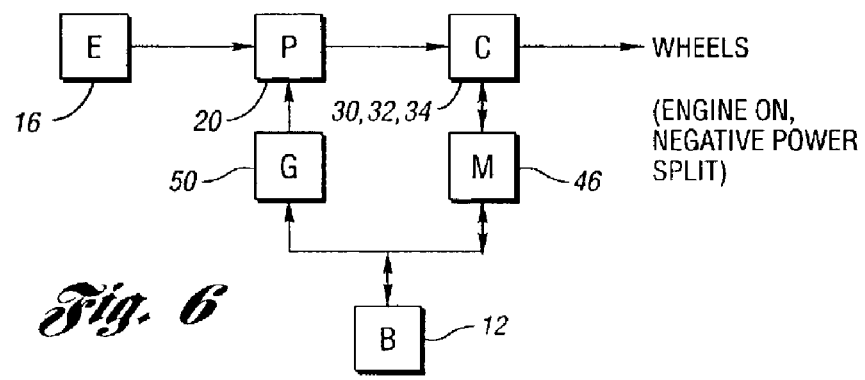
Fig. 6 (ENGINE ON, NEGATIVE POWER SPLIT)
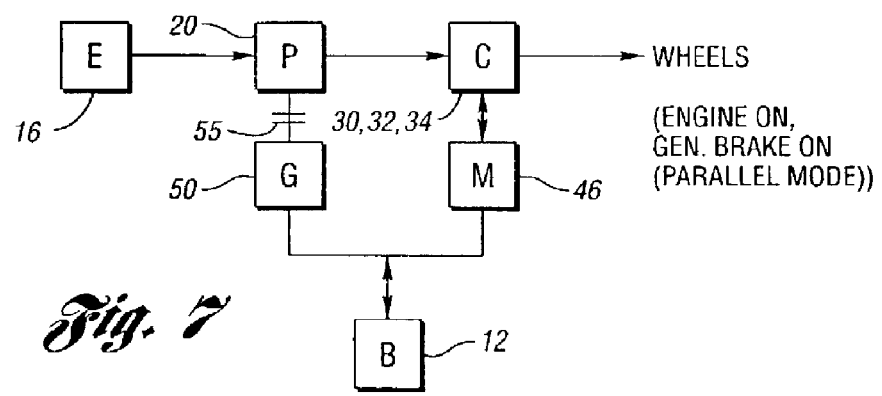
Fig. 7 (ENGINE ON, GEN. BRAKE ON (PARALLEL MODE))

CLOSED-LOOP POWER CONTROL FOR HYBRID ELECTRIC VEHICLES

BACKGROUND OF INVENTION

1. Field of the Invention

The invention relates to a control system for controlling distribution of power from a battery and an engine in a powertrain for a hybrid electric vehicle.

2. Background Art

A powertrain for a hybrid electric vehicle has two sources of power. One source typically is an internal combustion engine, and the second source is a high voltage electric motor, usually an induction motor. One class of hybrid electric vehicle powertrains comprises parallel hybrid electric powertrains.

A parallel hybrid electric powertrain may include two power source configurations, the first configuration comprising a combination of an engine, a motor and a generator with a battery and a planetary gearset for coordinating power distribution. The second power source configuration may comprise an electric drive system with only a motor, a generator and a battery. The battery acts as an energy storing device for the generator and the motor.

The engine output power of the first power source configuration can be split into two power flow paths by controlling the generator speed. A mechanical power flow path is established from the engine to the planetary gear unit, and ultimately to the transmission torque output shaft. The other power flow path is an electrical power flow path that distributes power from the engine to the generator to the motor, and hence to the torque output shaft of the transmission. The generator in this instance can operate also as a power input device, resembling the engine, for distributing power to the gearset if electric drive is desired. With this configuration, the generator, the motor and the gearset may operate as a electro-mechanical transmission with continuously variable ratio characteristics.

By braking the generator, the engine output power can be transmitted with a fixed gear ratio to the torque output shaft of the transmission through a fully mechanical power flow path.

The electric motor of the second power source draws power from the battery and provides driving torque independently of the engine during both forward and reverse drive modes. Further, the generator can draw power from the battery and drive the vehicle forward using a one-way reaction brake on the engine output shaft. In this instance, when the generator drive mode is in operation, the generator acts as a motor.

SUMMARY OF INVENTION

The invention makes it possible to integrate two power sources in a powertrain of the kind discussed in the preceding section, so that they work together seamlessly with a common gear system. In this way, the driver's demand for power is met as much as possible without exceeding the power limits of the powertrain, including the limits of the battery subsystem. The invention will accomplish this while optimizing the total powertrain efficiency and performance as it coordinates the control of power from the two power sources.

A vehicle system controller performs the coordination function in this split power powertrain. Under normal operating conditions, the vehicle system controller interprets the driver's demand for power as a function of acceleration or deceleration demand. It then determines when and how much torque each power source needs to provide to the transmission to meet the driver's power demand and to achieve specified vehicle performance (i.e., engine fuel economy, emission quality, etc.). The vehicle system controller determines the operating point of the engine torque and speed relationship.

The power supplied by the two power sources is coordinated by the vehicle controller of the invention as it meets the driver's demand without exceeding the limits of the system while optimizing total system efficiency and performance. This avoids a condition where the battery limits are exceeded, either during discharge or charging. It accomplishes this, furthermore, without limiting the vehicle performance. The invention is capable also of coordinating the control functions in high volume powertrain manufacturing operations where there are part-to-part variations in the powertrain components and variable environmental factors, such as temperature and barometric pressures. These features are achieved by using a closed-loop control technique.

The invention is a method that functions in a closed-loop fashion to deliver engine torque to a first torque input element of a gear system and to deliver torque from a torque output element of the gear system to vehicle traction wheels. This is done in a power split mode in the first power source configuration. During operation in the second power source configuration, torque is delivered from a motor and a generator through a gear system to the traction wheels with the engine deactivated.

Delivery of power from the two power sources in response to a driver demand for power is accomplished with optimum driveline efficiency and performance without exceeding power limits for either the engine or the battery.

In the description of an embodiment of the invention, reference will be made from time to time to "negative" and "positive" battery power requests. Assuming that the battery power request is for charging, that request refers to negative power. If the battery power request is for discharging, that request refers to positive power

BRIEF DESCRIPTION OF DRAWINGS

FIG. 4 is a schematic block diagram representation of a hybrid electric vehicle powertrain with only the motor and generator, together with the battery, acting as a power source;

FIG. 5 is a block diagram, similar to FIG. 4, wherein the engine is operating with a positive power split;

FIG. 6 is a block diagram, similar to FIG. 4, wherein the engine is on and the power flow has a negative power split;

FIG. 7 is a block diagram, similar to FIG. 4, wherein the engine is on and a generator brake is on, thereby establishing a parallel power flow mode.

DETAILED DESCRIPTION

Figure 1:
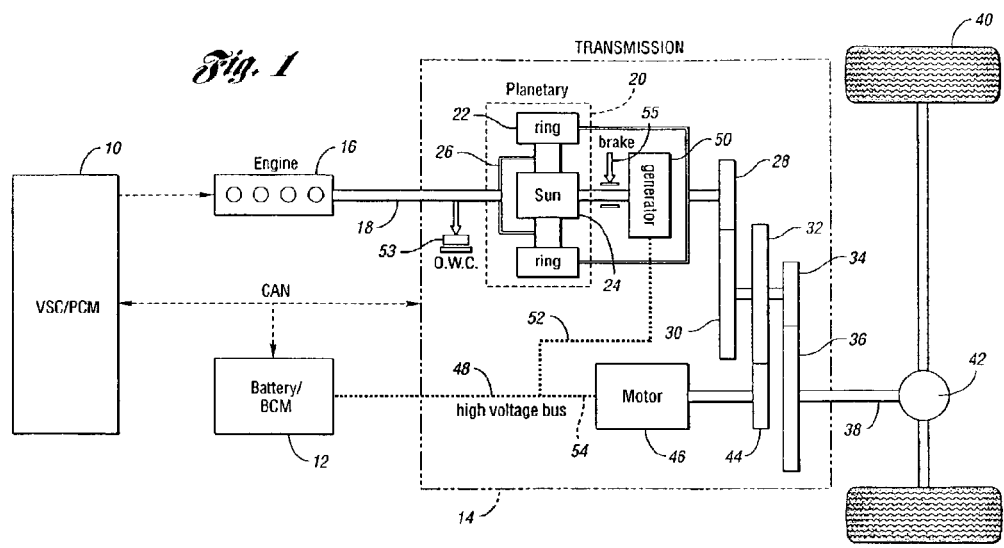
FIG. 1 is a schematic representation of a power split powertrain system configuration.

The disclosed hybrid electric vehicle powertrain has a parallel-series configuration, as shown in FIG. 1. A vehicle system controller 10, a battery 12 and a transaxle 14, together with a motor-generator subsystem, comprise a control area network (CAN). An engine 16, controlled by module 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential and axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery delivers electric power to the motor through power flow path 48. Generator 50 is connected electrically to the battery and to the motor in known fashion, as shown at 52.

When the powertrain battery 12 is acting as a sole power source with the engine off, the torque input 18 and the carrier assembly are braked by an overrunning coupling 53. A mechanical brake 55 anchors the rotor of generator 50 and the sun gear 24 when the engine is on and the powertrain is in a parallel drive mode, the sun gear 24 acting as a reaction element.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 2:
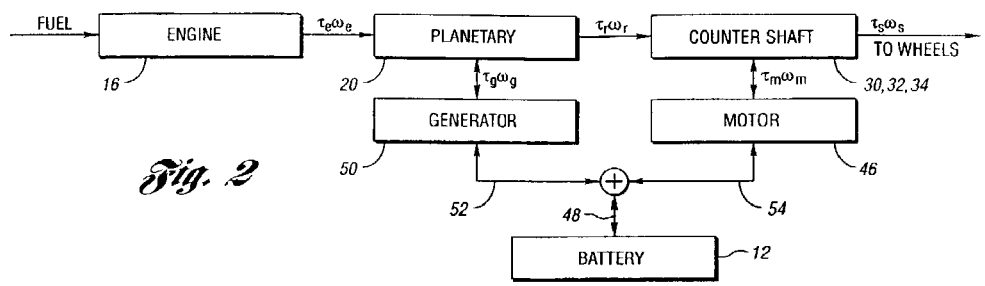
FIG. 2 is a schematic representation, in block diagram form, of a powertrain system power flow diagram.

The power flow paths between the various elements of the power split powertrain diagram shown in FIG. 1 is illustrated in FIG. 2. Fuel is delivered to the engine 16 under the control of the operator in known fashion using an engine throttle. Engine power delivered to the planetary gear unit 20 is expressed as $T_e \omega_e$, where $T_e$ is engine torque and $\omega_e$ is engine speed. Power delivered from the planetary ring gear to the countershaft gears is expressed as $T_r \omega_r$, which is the product of ring gear torque and ring gear speed, respectively. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2 by the torque flow path 52. Similarly, power distribution between the motor and the countershaft gears can be distributed in either direction, as shown by the torque flow path 54. Driving power from the battery or charging power to the battery is represented by the bi-directional arrow 48.

As shown in FIG. 2, engine output power can be split into two paths by controlling the generator speed. The mechanical power flow path, $T_r \omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. This condition is illustrated in FIG. 5, where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator is greater than zero or positive, and the generator torque is less than zero. The battery drives the motor 46, which distributes power to the countershaft. This arrangement is a positive power split.

If the generator, due to the mechanical properties of the planetary gear unit, acts as a power input to the planetary gear unit to drive the vehicle, the operating mode can be referred to as a negative power split. This condition is shown in FIG. 6, where the generator speed is negative and the generator torque also is negative.

The generator in FIG. 6 delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established. This is shown in FIG. 7, where the engine 16 is on and the generator is braked. The battery 12 powers the motor 46, which powers the countershaft gearing simultaneously with delivery of power from the engine to the planetary gearing to the countershaft gearing.

The first source of power can deliver torque only for forward propulsion because there is no reverse gear in the countershaft gearing. The engine requires either generator control or a generator brake to permit transfer of power to the wheels for forward motion.

The second source of power, previously described, is the battery, generator and motor subsystem. This is illustrated in FIG. 4. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

Figure 3:
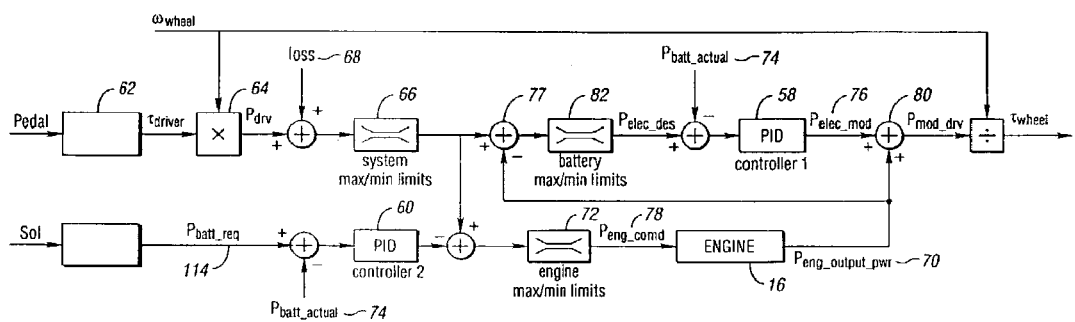
FIG. 3 is a schematic block diagram of a closed-loop power control system of the invention.

As previously indicated, the two power sources are integrated so that they seamlessly work together to meet the driver's demand for power without exceeding the system's power limits, including battery limits, while maintaining optimum powertrain efficiency and performance. The system will determine the driver's demand for torque and achieve the optimum split of power between the two power sources. If the battery limits are exceeded and the battery voltage is outside of a specified range, powertrain system shutdown may occur. In order to avoid this condition without limiting the maximum vehicle performance, the present invention coordinates the two power sources using a closed-loop power control. A schematic representation of the closed-loop power control is shown in FIG. 3. This ensures a proper coordination between the two power sources.

FIG. 3 is a block diagram for the closed-loop powertrain control system. It properly distributes total power request, which is the sum of the driver demand and the battery discharge and charge power request to the two power sources.

FIG. 3 includes a first PID controller 58, which is a closed-loop controller that prevents the actual battery power from exceeding defined limits. A second PID controller 60 ensures that the battery is being charged or discharged accordingly by adjusting the engine power command.

The control system shown in FIG. 3 calculates the driver power demand ($P_{drv}$) based on the driver torque demand and wheel speed $\omega_{wheel}$. The driver torque demand, $T_{driver}$, is derived from accelerator pedal position using transducer 62.

The wheel speed is obtained by a wheel speed sensor. The product of the wheel speed and the driver torque demand determines the driver power demand $P_{drv}$, as shown at 64.

Losses, $P_{loss}$, are electrical powertrain losses, which comprise motor losses and gearing losses (i.e., $P_{loss}=P_{motor}(t_{motor},\omega_{motor})$). After the electrical losses are accounted for at 68 and the maximum system limits are determined at 66 and the actual engine output power is determined at 70, the control system determines the battery power desired ($P_{elec\_des}$) that is within the battery limits. The engine power command ($P_{eng\_comd}$) is tested at 72 to determine whether it is within engine capability.

The actual battery power ($P_{batt\_actual}$) at 74 is used as a feedback for controller 58 to ensure, by determining modified battery power desired ($P_{elec\_mod}$) as shown at 76, that the actual battery power satisfies battery power desired ($P_{elec\_des}$). Therefore, the actual battery power does not exceed battery limits.

The control system algebraically adds the values $P_{elec\_mod}$ and $P_{eng\_output\_power}$ to determine the allowed driver demand $P_{mod\_drv}$. This sum will ensure that the maximum system capability is achieved without violating battery limits.

The control system calculates wheel torque command $$\left[\left(T_{wheel} = \frac{P_{mod} - drv}{\omega_{wheel}}\right)\right],$$

which is the driver torque command as limited to the system limits.

The second PID controller 60, as explained previously, adjusts the engine power command $P_{eng\_comd}$ to ensure that the battery power request $P_{batt\_req}$ for an optimal energy management strategy is achieved.

The first controller 58 may have a faster response than the second controller 60 to ensure control system stability.

If it is assumed, for example, that in a steady-state operating mode a driver requests 50 kw of power, after accounting for the electrical losses at 68, and the engine power output at 70 is 50 kw, the battery power desired ($P_{elec\_des}$) will be zero. The battery power desired ($P_{elect\_des}$) is the difference, determined at 77, between the value at comparator 66 and the engine output power at 70. Depending upon whether the electrical loss estimate is equal to the actual electrical loss, it is possible within steady-state operating conditions, that the output of controller 58 will be zero. This would cause the power at summing point 80 in FIG. 3 to be 50.

If, for example, the driver requests a change from a power level of 50 kw to a power level of 70 kw after accounting for electrical losses, and the engine limit is 50 kw, the battery will be called upon to supply 20 kw. If actual battery power 74 is close to the battery power demand as limited by the comparator at 82, the value for $P_{elec\_mod}$ will be equal to or less than 20. The two values are summed at 80 to produce the desired wheel torque $T_{wheel}$.

If the actual battery power 74 exceeds the battery power demand permitted by the comparator 82, the value for $P_{elec\_mod}$ will be reduced at comparator 82 so that the value for $P_{mod\_drv}$ will be smaller, thereby ensuring that the battery power optimal energy management strategy is satisfied.

Figure 8:
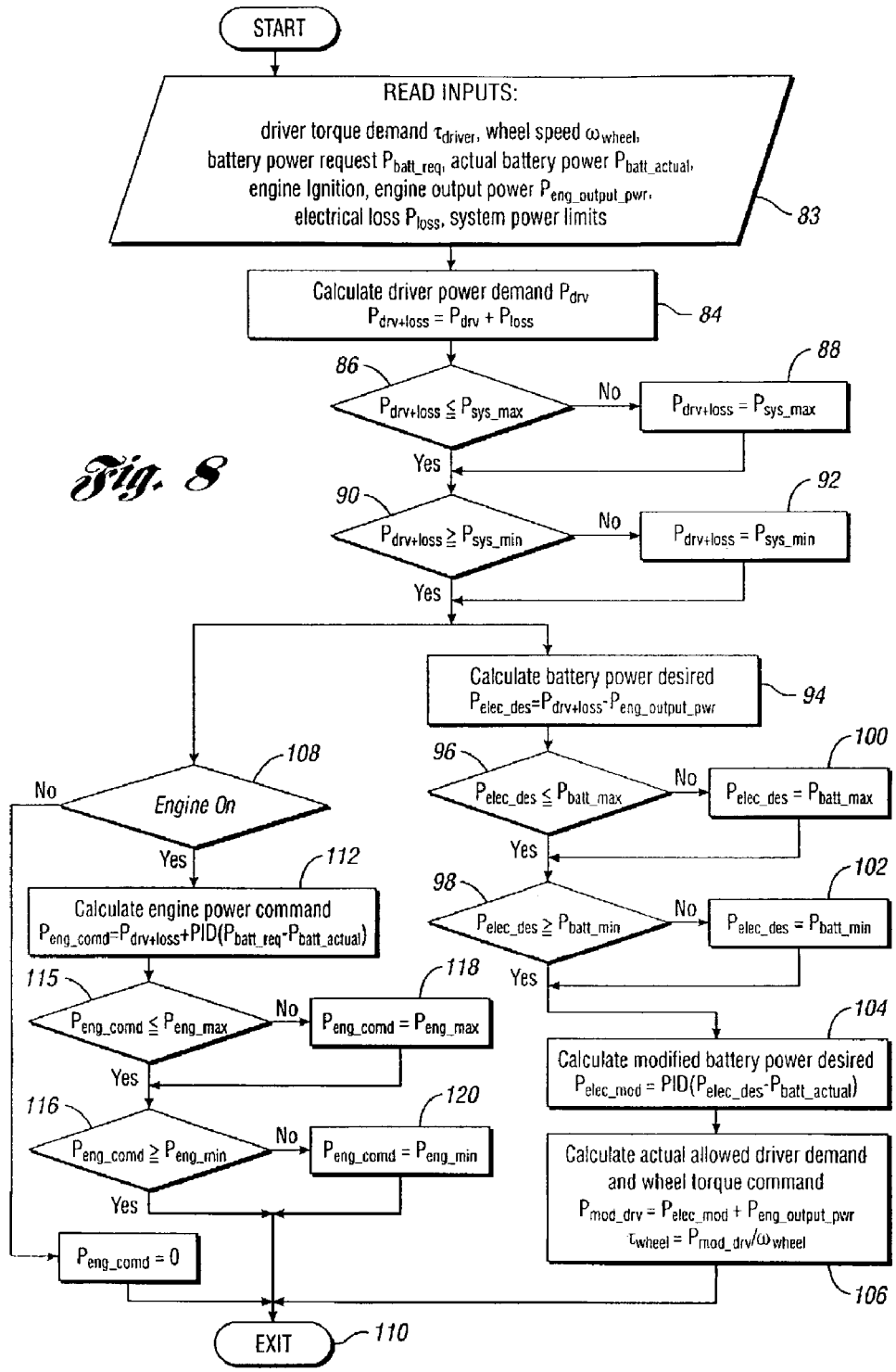
FIG. 8 is a function flow diagram illustrating software steps for carrying out control functions shown in FIG. 3 for the hybrid electric powertrain system of FIG. 1.

The software strategy for implementing the closed loop power control of FIG. 3 is shown in FIG. 8. At the beginning of the control routine, the various input signals are read, which include a driver torque command, the wheel speed, the battery power request, the actual battery power engine ignition, engine output power, electrical loss and system power limits. Monitoring of these input values occurs at step 83 in FIG. 8. Having received the input values, the driver power demand is calculated at 84. It then is determined at 86 whether the driver demand for power, plus the electrical losses, is less than or equal to the system maximum limit. If that power demand is not less than or equal to the system maximum limit, the driver power demand is set at 88 to a value equal to the maximum system limits. If the inquiry at 86 is positive, a similar test is made at step 90, where it is determined whether the driver demand for power, plus the electrical losses, is greater than the minimum value established at 66. If the inquiry is negative, the prior demand for power, plus the electrical loss, is set at 92 to a value equal to the system minimum limits. If the inquiry is positive, the routine will calculate the battery power desired, as shown at 94.

The magnitude of the battery power desired is equal to the difference between the driver demand for power and the engine output power, as shown at 94. If the electrical power desired is less than or equal to the maximum battery power permitted by the comparator 82, as shown at 96 in FIG. 8, the routine will proceed to step 98, where it is determined whether the electrical power desired is greater than or equal to the battery power minimum limit. As in the case of the steps shown at 88 and 92, the electrical power desired is set at the battery maximum or minimum limits at 100 or 102, respectively, if the inquiry at either 96 or 98 is negative.

If the inquiries at 96 and 98 are positive, the modified battery power desired $P_{elect\_mod}$ is calculated, as shown at 104. The value for $P_{mod\_drv}$ is equal to the sum of the values determined at 70 and 76 in FIG. 3. Torque at the wheels is equal to $P_{mod\_drv}$÷wheel speed, as shown at 106.

The control routine for the second controller 60 and the comparator 72 begins by determining whether the engine is on or off, as shown at 108. This occurs simultaneously and parallel to the sub-routine beginning at 94 in FIG. 8. If the engine is off, the routine will exit, as shown at 110. If the engine is on, the engine power command is calculated as shown at 112. The second controller 60 receives the algebraic sum of the values for the requested battery power at 114 in FIG. 3 and the actual battery power 74. If the calculated value for commanded engine power is less than or equal to the maximum engine power limit, as determined at 115, the routine will proceed to test the minimum engine power limit for engine commanded power at 116. The calculations for engine commanded power at 118 and 120 are similar to the calculations that occur at steps 88 and 92 and at steps 100 and 102.

It will be apparent to persons skilled in the art that modifications may be made to the embodiment of the disclosed invention without departing from the scope of the invention. All such modifications and equivalents thereof are intended to be covered by the following claims.

The invention claimed is:

1. A method for controlling a hybrid powertrain for an automotive vehicle having a driver controlled engine, an electric motor, a battery, a generator connected to the battery and a gear system that establishes first and second power sources for distributing torque to vehicle traction wheels, the method comprising the steps of:

delivering engine torque to a first torque input element of the gear system, delivering reaction torque of the gear system to the motor and generator and delivering torque from a torque output element of the gear system to the traction wheels thereby establishing a power split in a first power source configuration;

delivering torque from the motor and generator through the gear system to the traction wheels with the engine deactivated thereby establishing a second power source configuration; and coordinating power delivery from the first and second power sources whereby a response to driver demand for power will optimize driveline efficiency and performance without exceeding power limits for the engine and the battery including calculating driver power demand based on driver torque demand and vehicle speed;

determining a battery power request resulting from the coordination of power delivery from the first and second power sources;

combining the driver power demand and the battery power request;

determining whether the combined driver power demand and the battery power request is within predetermined maximum and minimum engine power limits to develop an engine power command and an actual engine output power;

combining the actual engine output power with the driver power demand;

measuring actual battery power;

determining whether the combined actual engine output power and the driver power demand is within pre-calibrated battery power limits to develop a battery power desired;

determining a modified battery power desired when actual battery power deviates from battery power desired; and combining the modified battery power desired and the actual engine output power to develop an actual allowed driver power demand.

2. The method set forth in claim 1 wherein the step determining a modified battery power desired comprises a closed-loop calculation using actual battery power as a feedback variable whereby pre-calibrated battery power limits are not exceeded.

3. The method set forth in claim 1 including the step of adjusting the engine power command in a closed-loop calculation using actual battery power as a feedback variable whereby a battery power request for optimal coordination of power delivery from the first and second power sources is maintained.

4. The method set forth in claim 3 including the step of determining whether a desired battery power to be combined with engine power output is within predetermined battery power maximum and minimum limits and controlling battery power to avoid exceeding the battery power limits thereby preventing the battery from overcharging or over-discharging.

5. The method as set forth in claim 3 including the step of determining whether the driver demand for power is within predetermined maximum and minimum system power limits; and delivering battery power to the gear system to complement the driver demand for power when the driver power demand is outside the engine power limits.

6. The method set forth in claim 5 including the step of determining whether a desired battery power to be combined with engine output power is within predetermined battery power maximum and minimum limits and controlling battery power to avoid exceeding battery power limits thereby preventing the battery from overcharging or over-discharging.

7. The method as set forth in claim 5 wherein the step of determining driver power demand includes the step of accounting for electrical losses in the powertrain whereby the effective demand for power is the sum of the driver power demand and electrical power losses.

* * * * *